(12) United States Patent
Tkatschenko et al.

(10) Patent No.: US 10,410,020 B2
(45) Date of Patent: Sep. 10, 2019

(54) METHOD AND SYSTEM FOR CHECKING THE PRESENCE AND/OR READABILITY OF AN ITEM OF PRODUCT INFORMATION

(75) Inventors: Olessja Tkatschenko, Willanzheim (DE); Peter Able, Gollhofen (DE)

(73) Assignee: Knauf Gips KG, Iphofen (DE)

( * ) Notice: Subject to any disclaimer, the term of this patent is extended or adjusted under 35 U.S.C. 154(b) by 0 days.

(21) Appl. No.: 14/368,196

(22) PCT Filed: Dec. 23, 2011

(86) PCT No.: PCT/EP2011/074013
§ 371 (c)(1),
(2), (4) Date: Dec. 10, 2014

(87) PCT Pub. No.: WO2013/091734
PCT Pub. Date: Jun. 27, 2013

(65) Prior Publication Data
US 2015/0136844 A1    May 21, 2015

(51) Int. Cl.
*G06K 1/12* (2006.01)
*G06K 5/02* (2006.01)

(52) U.S. Cl.
CPC ............... *G06K 5/02* (2013.01); *G06K 1/121* (2013.01)

(58) Field of Classification Search
CPC ....................................... G06K 1/121
See application file for complete search history.

(56) References Cited

U.S. PATENT DOCUMENTS

| | | | | | |
|---|---|---|---|---|---|
| 3,985,605 | A | * | 10/1976 | Treiber | B65C 1/021 156/384 |
| 4,204,639 | A | * | 5/1980 | Barber | G06K 19/08 229/67.1 |
| 5,007,748 | A | * | 4/1991 | Lee | B41J 3/01 101/93.13 |
| 5,128,527 | A | * | 7/1992 | Kawai | G06K 7/0166 235/462.07 |

(Continued)

FOREIGN PATENT DOCUMENTS

| | | |
|---|---|---|
| CN | 1498126 A | 5/2004 |
| CN | 1916930 A | 2/2007 |

(Continued)

*Primary Examiner* — Thien M Le
*Assistant Examiner* — Asifa Habib
(74) *Attorney, Agent, or Firm* — The Webb Law Firm

(57) ABSTRACT

The invention relates to a method for checking the presence and/or readability of an item of product information, in particular an item of packaging content information. An item of product information, in particular packaging content information, is applied to the product, in particular packaging, by using a printing device. A means of identification is applied by using the same printing device; and the product, in particular the packaging, is scanned with a reader in order to ascertain whether the means of identification is present and can be read, the means of identification comprising a barcode and/or a smart code, individual lines of the barcode being aligned parallel to a direction of print application, and the reader comprising an optical reader, in particular a barcode and/or smart-code reader, preferably a barcode and/or smart-code scanner.

18 Claims, 1 Drawing Sheet

(56) References Cited

U.S. PATENT DOCUMENTS

| | | | |
|---|---|---|---|
| 5,412,194 A * | 5/1995 | Melbye | G06K 5/00 |
| | | | 235/437 |
| 5,569,899 A | 10/1996 | Tedesco | |
| 5,777,310 A * | 7/1998 | Liu | G06K 7/1465 |
| | | | 235/437 |
| 5,886,334 A | 3/1999 | D'Entremont et al. | |
| 6,042,279 A | 3/2000 | Ackley | |
| 6,158,660 A * | 12/2000 | Blanford | G06K 7/14 |
| | | | 235/462.11 |
| 6,419,782 B1 * | 7/2002 | Johnson | B65C 1/02 |
| | | | 156/249 |
| 7,182,259 B2 * | 2/2007 | Lubow | G06K 1/121 |
| | | | 235/437 |
| 9,721,335 B2 * | 8/2017 | Phillips | G06T 7/0004 |
| 2003/0080191 A1 | 5/2003 | Lubow et al. | |
| 2004/0026636 A1 | 2/2004 | Shigeta | |
| 2005/0082376 A1 * | 4/2005 | Lubow | G06K 1/121 |
| | | | 235/494 |
| 2006/0118631 A1 * | 6/2006 | Lubow | G06K 1/121 |
| | | | 235/462.01 |
| 2009/0072035 A1 * | 3/2009 | Ota | G06K 1/121 |
| | | | 235/462.16 |
| 2009/0108080 A1 * | 4/2009 | Meyer | G06Q 20/14 |
| | | | 235/494 |
| 2011/0007343 A1 * | 1/2011 | Hopper | G06K 5/02 |
| | | | 358/1.15 |
| 2016/0159103 A1 * | 6/2016 | Ellis | B41J 2/355 |
| | | | 347/211 |
| 2016/0188914 A1 * | 6/2016 | Ackley | G06K 1/121 |
| | | | 235/375 |

FOREIGN PATENT DOCUMENTS

| | | |
|---|---|---|
| CN | 101149778 A | 3/2008 |
| EP | 0932111 A2 | 7/1999 |
| WO | 9303454 A1 | 2/1993 |
| WO | 9522098 A1 | 8/1995 |
| WO | 9610798 A1 | 4/1996 |
| WO | 9948037 A1 | 9/1999 |

* cited by examiner

METHOD AND SYSTEM FOR CHECKING THE PRESENCE AND/OR READABILITY OF AN ITEM OF PRODUCT INFORMATION

CROSS-REFERENCE TO RELATED APPLICATION

This application is the United States national phase of International Application No. PCT/EP2011/074013 filed Dec. 23, 2011, the disclosure of which is hereby incorporated in its entirety by reference.

BACKGROUND OF THE INVENTION

Field of the Invention

The invention relates to a method for checking the presence and/or readability of an item of product information of a product, in particular an item of packaging content information of a packaging, the invention also relates to a corresponding printing device and to a use of a printing device.

Description of Related Art

In packaging installations, for example sack or bag filling installations, it is usually checked or monitored by the installation operators whether packaging content information, in particular a production date imprint, is present and can be read. This is intended to ensure that no unlabelled products, for example production bags, reach the customer, in order to avoid complaints. Altogether, this monitoring method is comparatively laborious. Even when the employees are highly reliable, there is still quite a great probability of unlabelled products, for example production bags, reaching the customer. The probability of complaints is therefore still comparatively high.

The present invention is based on the object of improving the reliability of the monitoring of a printed-on item of product information, in particular packaging content information, in a simple way.

SUMMARY OF THE INVENTION

In particular, the object is achieved by a method for checking the presence and/or readability of an item of product information of a product, in particular an item of packaging content information of a packaging, the method comprising the steps of:
a) applying (printing) the item of product information, in particular packaging content information, to (on) the product, in particular packaging, by using a printing device;
b) applying (printing on) a separate (machine-readable) means of identification, formed in addition to the item of product information, in particular packaging content information, by using the (same) printing device;
c) scanning the product, in particular packaging, with a reader in order to ascertain whether the means of identification is present and can be read.

A key concept of the invention is that (indirect) checking of the presence and/or readability of an item of product information is possible indirectly by way of the printing on and reading of the means of identification, by the same printing device being used both for the item of product information, in particular packaging content information, and the means of identification. According to a specific development, the (machine-readable) means of identification can then be read by an appropriate reader in a simple way. The fact that the same printing device is used means that it can be assumed with a high degree of probability that, when the means of identification has been printed on (successfully), the item of product information, in particular packaging content information, has also been printed on successfully (in particular in a machine-readable form). This makes it possible to dispense with a direct check—to be carried out by the installation operator—of the presence and/or readability of the item of product information, in particular packaging content information. It goes without saying that it is conceivable that yet a further check, to be carried out for example by an installation operator, also takes place to improve the reliability further. This is not absolutely necessary however.

The invention makes use in a simple way of the notion that, with a high degree of probability, an error in the printing on of the item of product information, in particular packaging content information, for example caused by a blocked nozzle of an inkjet printer (or date recorder), is also accompanied by an error-affected or unaccomplished application of the means of identification. Therefore, by providing the reader, the presence and/or readability of the item of product information (the item of packaging content information) can be deduced in a simple way. The method is therefore simplified considerably in comparison with the method described above, in which checking is performed by the installation operators, while at the same time the reliability of the checking is improved.

The means of identification comprises a barcode and/or smart code (or is formed by such a code). Such a means of identification can be printed and read in a simple way. The reader may comprise an optical reader, in particular a barcode and/or smart-code reader, in particular a barcode and/or smart-code scanner (or be formed by such a reader and/or scanner).

Individual lines of the barcode are aligned parallel to a direction of print application. In the case of such an embodiment, even when there is a partial failure of an application device (for example only one or a few blocked nozzles of an inkjet printer), a defective application or a defective imprint can be detected in a simple way. This makes the checking even more reliable. A "ladder" barcode is preferred over a "picket fence" barcode. In the case of a "picket fence" barcode, that is to say a barcode in which the individual lines are arranged perpendicularly to the direction of print application, even a segment of the barcode would be sufficient to allow the barcode to be read by the reader; if on the other hand a "ladder" barcode (that is to say a barcode in which the individual lines are arranged parallel to the direction of print application) is provided, it can be assumed with a higher degree of probability that the item of product information is similarly readable. As soon as a line is missing from the barcode, this can be indicated or detected. It is particularly advantageous if the "ladder" barcode finishes flush with the item of product information (for example a production date) in terms of its width. The barcode may have a width of (approximately) 0.8 cm to 1.2 cm, in particular 1.0 cm. The width corresponds to the extent perpendicularly to the alignment of the individual lines of the barcode or perpendicularly to the direction of print application.

The direction of application, or in the specific case the direction of print application, should be understood as meaning that direction that is predetermined by the application process (or printing-on process) and is intended to be directed from a starting point of the application (printing on)

to an end point of the application (printing on). For example, the direction of application may be predetermined by the application device (such as for example an inkjet printer) and/or by a movement (transporting movement) of the product (for example on a conveyor belt).

In a preferred embodiment, step a) is carried out before step b). The application of the means of identification therefore takes place at a time after the application of the item of product information, in particular packaging content information. As a result, the meaningfulness of an error in connection with the printing of the means of identification is increased in a simple way, which makes the method more reliable.

On account of the increasingly lower costs of digital original image recording devices, there is a trend in the prior art towards ascertaining the presence and/or readability of items of product information—if not performed manually—by recording an original image and corresponding software evaluation. Counter to this trend, it is now being proposed according to the invention to dispense with such digital original image recordings and to accomplish checking by reading a smart code or barcode. This has proven to be advantageous in hindsight, in particular under extreme conditions, as exist for example in sack or bag filling installations for gypsum or the like. Under such conditions, digital cameras for example can easily become soiled, which may make them unusable (or at least less reliable). It has been found, however, that under such conditions the reading of a barcode or smart code is still (reliably) possible. Altogether, a solution that is structurally simple and favourable, and in spite of its structural simplification more reliable than the trend in the prior art, is being proposed by the present invention.

A time interval between the application of the item of product information, in particular packaging content information, and the application of the means of identification may be less than 60 seconds, preferably less than 20 seconds, more preferably less than 3 seconds, still more preferably less than 1 second. A comparatively small interval has the effect that the probability of an error in connection with the printing of the means of identification being accompanied by an error concerning the printing of the item of product information, in particular packaging content information, is increased. Consequently, the reliability of the method is increased. In conceivable embodiments, the time interval is greater than or equal to 0.5 second, preferably greater than or equal to 1 second. As a result, the printing on is simplified.

Preferably, the means of identification is applied behind the item of product information, in particular packaging content information, with respect to a direction of application (direction of print application). By such an arrangement or application or print application, use is made in a particularly simple and reliable way of the fact that an error in connection with the application of the item of product information can be detected through a simply ascertainable error in connection with the application of the means of identification.

A spatial interval between the (printed-on) item of product information, in particular packaging content information, and the (printed-on) means of identification may be less than or equal to 10 cm, preferably less than or equal to 5 cm, still more preferably less than or equal to 3 cm. Such a comparatively small interval has the effect that the probability of the printing conditions that are predetermined by the location of the printing being comparatively homogeneous is comparatively high. If the packaging is soiled, for example, the probability of the soiling having an effect on both the readability of the means of identification and the readability of the item of product information or packaging content information is thus comparatively high. In further alternatives that are provided, the spatial interval may be greater than or equal to 0.5 cm, preferably greater than or equal to 1 cm, still more preferably greater than or equal to 3 cm. As a result, the reading of the means of identification is simplified (for example it is only with a lower degree of probability that the item of product information or packaging content information can have an influence on the reading of the means of identification).

In general, the method relates to the monitoring of the imprint of a packaging content. Sacks, bags, cases or the like come into consideration for example as packagings. The imprint may for example comprise a production date or an expiry date (or consist of such dates). In particular in the case of products that can also come on the market in an unpackaged form (for example bricks, plasterboards or the like), it is however also conceivable that an item of product information, in particular a product information imprint, is applied directly to the product. The items of product information may also be such items of information that are for example only attached or connected to the product, for example on a sticker or an attached plate or the like.

In the case of a preferred embodiment, a warning signal and/or an indication and/or an interruption of a product handling process, in particular a product shipping and/or product packaging and/or product labelling process, takes place if it is ascertained in step c) that the means of identification is not present or cannot be read. This allows the reliability of the monitoring method to be further improved. For example, a conveyor belt may stop (immediately) and/or a signal (for example a flashing light) may take place, letting the operator of the installation know that there is possibly an error with the labelling of the product or the packaging.

In a specific development, the same means of identification and possibly different items of product information or packaging content information may be applied to a multiplicity of products or packagings. The use of a means of identification that is always the same has the effect that the method is simplified further, in particular with regard to the reading of the means of identification. At the same time, the reliability of the monitoring is thereby increased. Such a development also allows use to be made of a very central advantage of the present invention, that is the utilization of correlations between the presence of the means of identification and the item of product information.

In a specific embodiment, the item of product information, in particular packaging content information, comprises letters and/or numbers and/or special symbols (or consists of such letters, numbers and/or special symbols), in particular a (production) date (or consists of such a date). Letters or numbers allow items of product information or packaging content information to be indicated in a simple way (to be precise independently of the customer's technical equipment). If such data, such as for example production data, are linked with a machine-readable means of identification (for example a barcode), monitoring in respect of the extent to which the data are present and can be read is made possible in a simple way.

The aforementioned object is independently achieved by a system, in particular for carrying out the aforementioned method, for checking (monitoring) the presence and/or readability of an item of product information, in particular packaging content information, comprising a printing device, which is designed to print on the product, in particular packaging, the item of product information, in particular packaging content information, and also a separate means of identification, formed in addition to the item of product information, in particular packaging content information, and a reader, which is designed to ascertain whether the means of identification is present and can be read. The means of identification comprises a smart code and/or a barcode, individual lines of the barcode being aligned parallel to a direction of print application. A predetermined product or packaging may likewise be a component part of the system. With respect to the advantages of the system, reference is made to the above method.

The printing device of the system preferably comprises an inkjet printer (with an inkjet nozzle), in particular a date recorder. In the case of an inkjet printer, it can then be ascertained in a simple way whether it is functioning faultlessly, in particular whether the inkjet nozzle is possibly blocked. If the inkjet nozzle is blocked, neither the item of product information nor the means of identification is printed on. Therefore, an absence or inadequate execution of the item of product information can be detected in a simple way.

The reader may be an optical reader, in particular a barcode and/or smart-code reader, preferably a barcode and/or smart-code scanner. As a result, the monitoring of the imprint is simplified further. The item of product information may be formed by numbers and/or letters and/or special symbols, in particular a (production) date. The system may comprise a warning signal device, in particular a warning light.

In a preferred embodiment, a transporting device, for example a conveyor belt, is provided between the printing device and the reader, in order to transport the products from the printing device to the reader. As a result, the monitoring of the item of product information, in particular packaging content information, is simplified further.

The aforementioned object is independently achieved by a printing device for making it possible to check the presence and/or readability of an item of product information, in particular packaging information, in particular for carrying out or making it possible to carry out the method of the type described above, preferably as a component part of the system of the type described above, the printing device being designed to print on a product, in particular packaging, an item of product information, in particular packaging content information, and also a separate means of identification, formed in addition to the item of product information, in particular packaging content information. The means of identification comprises a smart code and/or a barcode, individual lines of the barcode being aligned parallel to a direction of print application. With respect to the advantages, reference is made to the method described above and the system described above.

In a preferred embodiment, the printing device is preprogrammed in such a way that, when a command for printing an item of product information, in particular packaging content information, is supplied externally, a (separate) means of identification is automatically printed on the product or packaging. As a result, monitoring of the item of product information is simplified further. In specific embodiments, for example, corresponding printing programs may be stored in the printing device, so that the means of identification is printed on— without external instruction. With regard to the structural design, storage means and control units (processors or the like) may be provided for this.

The aforementioned object is also independently achieved by the use of a printing device for making it possible to check the presence/readability of an item of product information, in particular packaging content information, in particular for the method of the type described above and/or the system of the type described above, the same printing device, in particular the same printing material output unit, being used for printing the product, in particular packaging, both with the item of product information, in particular packaging content information, and with a separate means of identification, formed in addition to the item of product information, in particular packaging content information. The means of identification comprises a smart code and/or a barcode, individual lines of the barcode being aligned parallel to a direction of print application. With respect to the advantages, reference is made to the method described above.

The present invention has the effect in particular of considerably simplifying the monitoring of for example a production date imprint for presence and readability. By contrast with the prior art, simple (technical) monitoring of the presence and readability of for example a production date is thus made possible.

For example, a ladder barcode can be printed on "in one operation" (without a significant time delay) with a production date (or some other item of product information) by a writing system and subsequently read by a reader, for example a barcode reader. If the means of identification (the barcode) can be read by the reader (the barcode reader), all of the nozzles of a data recorder for example are free and the readability of the item of information (for example the production date) can be assumed with a high degree of probability. Should this not be the case, it may be provided that a transporting means (for example a conveyor belt) stops immediately and possibly emits a signal (for example a flashing light), from which an operator of the installation can detect that there is an error. In particular, it is ensured that no unlabelled products or packagings (for example sacks or bags) reach the customer unnoticed.

Where a barcode is used, it is particularly advantageous if it is arranged behind the production date in the direction of print application and is aligned "in ladder form" (so that individual lines of the barcode lie parallel to the direction of print application). In particular, the barcode should be printed on in one operation and in one plane with the item of product information (for example the production date).

If the barcode is printed on behind the item of product information in the direction of print application, it is simpler for example for nozzles of an inkjet printer to be checked. In particular, it could be detected if the nozzles become clogged during the printing on, resulting in an item of product information (for example date) that cannot be read. A further advantage of a "ladder" form of the barcode is that even comparatively simple barcode readers can be used if the direction of print application is the same as a direction of movement of the barcode or the product (which may typically be predetermined by a conveyor belt). In the case of a "picket fence" (vertical) barcode, it could be read even from a segment of for example a few millimeters. Then the completeness and readability of the date imprint could at least not be checked over the entire width. It could be for example that upper or lower nozzles of an inkjet printer are blocked, so that only part of the "picket fence" barcode is printed on. This could then be read by a barcode reader without the readability of the date being ensured. Therefore, a ladder (horizontal) barcode, which can only be read by the barcode reader when there is a full imprint (over the entire width), should be used.

The invention is also described below with respect to further features and advantages. Modifications of these are familiar to a person skilled in the art.

DETAILED DESCRIPTION OF THE INVENTION

Figure 1:
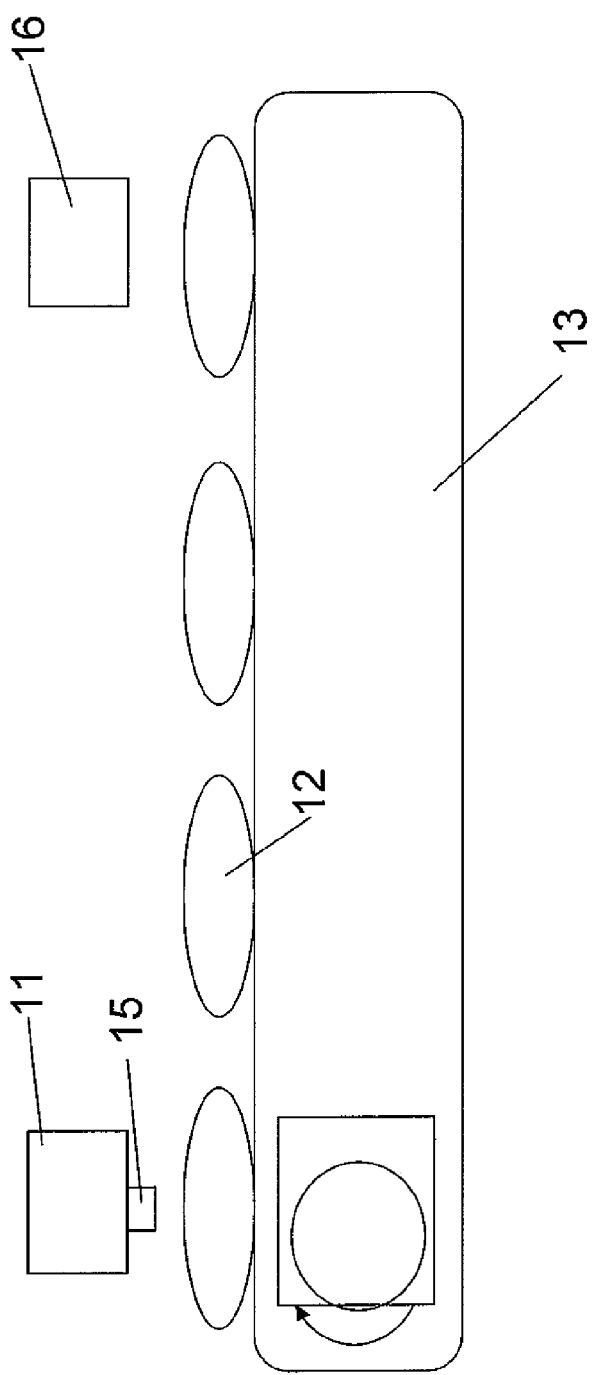
FIG. 1 shows a system for checking the presence and/or readability of a production date of a product that is being filled into sacks or bags.

In the description that follows, the same reference numerals are used for parts that are the same and act in the same way.

Figure 2:
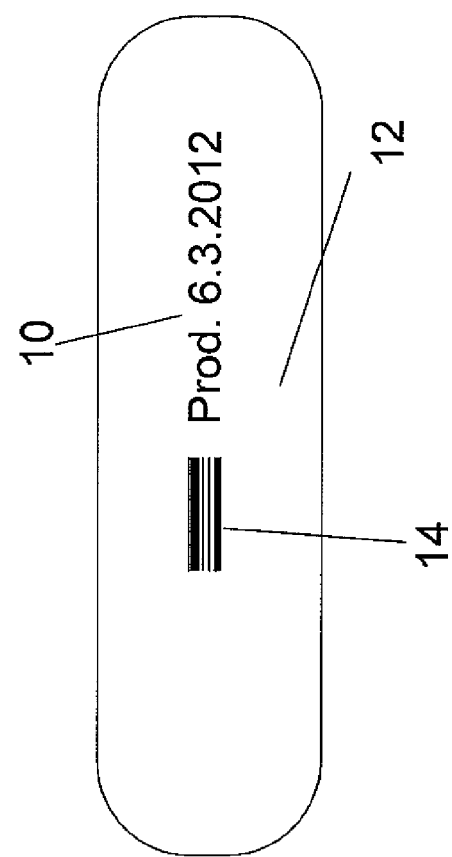
FIG. 2 shows a sack or bag with a production date and a means of identification.

FIG. 1 shows a system for checking (or monitoring) the presence and/or readability of an item of product information (in the specific case a production date 10, see FIG. 2).

The production date 10 is applied by an inkjet printer 11 to a sack or bag 12, which is transported by means of a transporting device 13 (in FIG. 1 from the left to the right). The inkjet printer 11 prints the sack or bag 12 both with the production date 10 and with a barcode 14. Both the production date 10 and the barcode are applied by the same nozzle 15 of the inkjet printer 11. After the printing on of the production date 10 and the barcode 14, the sack or bag 12 is transported to a reader 16, which is designed as a barcode scanner. It can consequently be ascertained by the reader 16 whether the barcode 14 is present and can be read. This in turn allows it to be deduced whether the production date 10 is present and can be read.

In FIG. 1, the transporting direction takes place from the left to the right. The direction of print application in FIG. 2 consequently runs from the right to the left. With reference to the direction of print application, the barcode 14 is consequently arranged behind the production date 10 (or, in the direction of movement according to FIG. 1, in front of the production date).

"Printing" or "printing on" should be understood in particular as meaning an application of dye or ink to the product or a product packaging. The term "printing" may however also be understood generally as including for example applying a stamped imprint. Instead of an inkjet printer 11, some other printing device may also be used.

LIST OF DESIGNATIONS

10 Production date
11 Inkjet printer
12 Sack or bag
13 Transporting device
14 Barcode
15 Nozzle
16 Reader

The invention claimed is:

1. A method for checking the presence and/or readability of an item of product information of a product in a product handling process moving along a transportation means, in particular an item of packaging content information of a packaging, comprising the steps of:

a) applying the item of product information, in particular packaging content information, to the product, in particular to the packaging, by using a printing device;

b) applying a separate means of identification, formed in addition to the item of product information, in particular packaging content information, by using the same printing device; and c) scanning the product, in particular the packaging, with a reader in order to ascertain whether the means of identification is present and can be read, the means of identification comprising a barcode and/or a smart code, individual lines of the barcode being aligned parallel to a direction of print application; and d) stopping the transportation means when the means of identification is not present or cannot be read, wherein the reader comprises an optical reader, in particular a barcode and/or smart-code reader, preferably a barcode and/or smart-code scanner, the means of identification is printed spatially behind and temporally after the item of product information with respect to the direction of print application, and a spatial interval between the item of product information and the means of identification is less than or equal to 10 cm.

2. The method according to claim 1, wherein step a) is carried out before step b) and/or in that a time interval between the application of the item of product information, in particular packaging content information, and the application of the means of identification is less than 20 seconds, preferably less than 3 seconds, still more preferably less than 1 second.

3. The method according to claim 2, wherein the time interval between the printing of the item of product information and the printing of the means of identification is less than 3 seconds.

4. The method according to claim 1, wherein the transportation means comprises a conveyor belt.

5. The method according to claim 1, wherein said means of identification and possibly different items of product information or packaging content information are applied to a multiplicity of products or packagings.

6. The method according to claim 1, wherein the item of product information, in particular packaging content information, comprises letters and/or numbers and/or special symbols, in particular a production date.

7. The method according to claim 6, wherein the item of product information comprises a production date.

8. The method according to claim 1, wherein step (d) further comprises alerting an operator when it is ascertained that the means of identification is not present or cannot be read.

9. The method according to claim 1, wherein the direction of print application is predetermined by a movement of the product.

10. The method according to claim 1, wherein the spatial interval between the item of product information and the means of identification is less than or equal to 5 cm and greater than or equal to 1 cm.

11. The method according to claim 1, wherein the optical scanner comprises a barcode and/or smart-code scanner.

12. A system for checking the presence and/or readability of an item of product information, in particular an item of packaging content information in a product handling process moving along a transportation means, comprising:

a printing device, which is designed to print on the product, in particular packaging, the item of product information, in particular packaging content information, and also a separate means of identification, formed in addition to the item of product information, in particular packaging content information;

a reader, which is designed to ascertain whether the means of identification is present and can be read, the means of identification comprising a barcode and/or a smart code, individual lines of the barcode being aligned parallel to a direction of print application; and a means for stopping the product handling process when the reader determines the means of identification either is not present or cannot be read; wherein the reader comprises an optical reader, in particular a barcode and/or smart-code reader, preferably a barcode and/or smart-code scanner, the means of identification is printed spatially behind and temporally after the item of product information with respect to the direction of print application, and a spatial interval between the item of product information and the means of identification is less than or equal to 10 cm.

13. The system according to claim 12, wherein the printing device is an inkjet printer with an inkjet nozzle, in particular a date recorder, and/or the reader is an optical reader, in particular a barcode and/or smart-code reader and/or the item of product information, in particular packaging content information, comprises numbers and/or letters and/or special symbols, in particular a date, preferably a production date, and/or the system comprises a warning signal device, in particular a warning light.

14. The system according to claim 13, wherein the item of product information comprises a production date.

15. The system according to claim 12, wherein the transporting means is provided between the printing device and the optical reader, in order to transport the products from the printing device to the optical reader.

16. The system according to claim 12, further comprising a means for alerting an operator of the product handling process when the means of identification is either not present or cannot be read.

17. The system according to claim 12, wherein the direction of print application is predetermined by a movement of the product.

18. The system according to claim 12, wherein the optical reader comprises a barcode and/or smart-code scanner.

\* \* \* \* \*